United States Patent
Horii et al.

(10) Patent No.: US 8,177,012 B2
(45) Date of Patent: May 15, 2012

(54) SADDLE-RIDE TYPE FUEL CELL THREE-WHEELED VEHICLE

(75) Inventors: Yoshiyuki Horii, Saitama (JP); Shinji Furuta, Saitama (JP); Katsumi Sahoda, Saitama (JP); Yoshihiro Namiki, Saitama (JP); Ranju Imao, Saitama (JP); Takuya Warashina, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 910 days.

(21) Appl. No.: 12/212,283

(22) Filed: Sep. 17, 2008

(65) Prior Publication Data

US 2009/0075152 A1 Mar. 19, 2009

(30) Foreign Application Priority Data

Sep. 19, 2007 (JP) ................................. 2007-242243

(51) Int. Cl.
*B62D 61/06* (2006.01)
(52) U.S. Cl. ....................... 180/214; 180/216
(58) Field of Classification Search .................. 180/214, 180/210, 215, 216, 65.1; 429/34, FOR. 132
See application file for complete search history.

(56) References Cited

U.S. PATENT DOCUMENTS

| | | | | |
|---|---|---|---|---|
| 3,219,137 A * | 11/1965 | Appleton | ...................... | 180/214 |
| 5,193,635 A * | 3/1993 | Mizuno et al. | ............. | 180/65.25 |
| 6,679,345 B2 * | 1/2004 | Hirayama et al. | ......... | 180/65.31 |
| 6,729,114 B2 * | 5/2004 | Fillman et al. | .................. | 56/10.6 |
| 6,889,784 B2 * | 5/2005 | Troll | ................................ | 180/13 |
| 7,337,799 B2 * | 3/2008 | Delfino et al. | ................... | 137/79 |
| 7,401,670 B2 * | 7/2008 | Horii et al. | ..................... | 180/65.1 |
| 7,404,462 B2 * | 7/2008 | Tokumura et al. | ......... | 180/65.31 |
| 7,478,698 B2 * | 1/2009 | Shimizu et al. | ............. | 180/220 |
| 7,484,582 B2 * | 2/2009 | Iwashita et al. | ............... | 180/65.1 |
| 7,591,647 B2 * | 9/2009 | Shoji et al. | ...................... | 431/343 |
| 7,681,677 B2 * | 3/2010 | Shimizu et al. | ............ | 180/65.31 |
| 7,699,127 B2 * | 4/2010 | Horii et al. | .................... | 180/65.1 |
| 2005/0061578 A1 * | 3/2005 | Schulte | ......................... | 181/227 |
| 2008/0217087 A1 * | 9/2008 | Ito et al. | ......................... | 180/220 |

FOREIGN PATENT DOCUMENTS

JP 2001-313056 A 11/2001

* cited by examiner

*Primary Examiner* — Drew Brown
(74) *Attorney, Agent, or Firm* — Birch, Stewart, Kolasch & Birch, LLP

(57) ABSTRACT

A saddle-ride three-wheeled vehicle has a fuel cell which generates an electric power by a chemical reaction between a fuel gas and a reaction gas. The three-wheeled vehicle includes a drain pipe which guides water discharged from the fuel cell out of a vehicle body; a rear body to which a pair of left and right rear wheels are journaled; and a linking mechanism which swingably links the rear body and a front body to allow the front body to sway left and right with respect to the rear body, wherein the drain pipe has a drain port between the pair of left and right rear wheels.

17 Claims, 5 Drawing Sheets

SADDLE-RIDE TYPE FUEL CELL THREE-WHEELED VEHICLE

CROSS-REFERENCE TO RELATED APPLICATIONS

This nonprovisional application claims priority under 35 U.S.C. §119(a) on Patent Application No. 2007-242243, filed in Japan on Sep. 19, 2007, the entirety of which is incorporated herein by reference.

BACKGROUND OF THE INVENTION

1. Field of the Invention

The present invention relates to a saddle-ride type fuel cell three-wheeled vehicle and more particularly to a saddle-ride type fuel cell three-wheeled vehicle which smoothly drains the water generated by the fuel cell out of the vehicle body without causing the water to splash on the rear wheels or rear body.

2. Background of the Invention

A fuel cell vehicle which has a fuel cell has been known. The fuel cell generates electric power by chemical reaction between hydrogen as a fuel gas and oxygen contained in a reaction gas (air). The fuel cell vehicle uses a motor driven by the power supplied from the fuel cell. Since the fuel cell generates water due to the chemical reaction between hydrogen and oxygen, the fuel cell vehicle has a system to drain the generated water out of the vehicle body.

Japanese Patent Application Publication No. JP 2001-313056 discloses a fuel cell two-wheeled vehicle in which a drain port for generated water is located almost in the center of the vehicle body along a lateral side of the vehicle body and oriented rearward to prevent the generated water from splashing on the rear wheel during drainage of the water.

However, if the structure disclosed in JP 2001-313056 is applied to a fuel cell three-wheeled vehicle with a pair of left and right rear wheels, the vehicle width should probably be larger because a drain port must be located outside of a wheel. Besides, in a swingable fuel cell three-wheeled vehicle in which the front body for a rider to sit on can be banked with respect to the rear body supporting the rear wheels, if a drain port is located on the front body, the generated water may be more likely to be splashed on the rear wheels or rear body because the drain port moves as the front body is banked.

SUMMARY OF THE INVENTION

An object of the present invention is to address the above problem of the prior art and provide a saddle-ride type fuel cell three-wheeled vehicle which smoothly drains the water generated by the fuel cell out of the vehicle body without splashing the water on the rear wheels or rear body.

To achieve the object, according to a first aspect of the present invention, a saddle-ride type fuel cell three-wheeled vehicle having a fuel cell which generates an electric power by a chemical reaction between a fuel gas and a reaction gas, includes a drain pipe which guides water discharged from the fuel cell out of a vehicle body, a rear body to which a pair of left and right rear wheels are journaled, and a linking mechanism which swingably links the rear body and a front body to allow the front body to sway left and right with respect to the rear body, and the drain pipe has a drain port between the pair of left and right rear wheels.

Furthermore, according to a second aspect of the present invention, the drain port is located behind and under the axle of the rear wheels when the vehicle body is viewed sideways.

Furthermore, according to a third aspect of the present invention, the vehicle includes a shock unit which suspends the rear body on a body frame and absorbs the vertical swinging motion of the rear body, and the drain pipe extends under the shock unit to the rear body's bottom side.

Furthermore, according to a fourth aspect of the present invention, the fuel cell is attached to the front body and located under a seat for a rider to sit on, and the drain pipe includes a first drain pipe portion which guides the generated water from the fuel cell to tinder the linking mechanism and a second drain pipe portion which guides the generated water from under the linking mechanism out of the vehicle body. The first drain pipe portion and the second drain pipe portion are supported by the vehicle body in a manner that the first drain pipe portion can circumferentially turn with respect to the second drain pipe portion.

Furthermore, according to a fifth aspect of the present invention, the vehicle has a reservoir which temporarily stores the generated water between the first drain pipe portion and second drain pipe portion, the reservoir is attached to the rear body, and the first drain pipe portion is circumferentially turnably engaged with the reservoir.

According to the first aspect of the present invention, since the vehicle includes a drain pipe which guides generated water discharged from the fuel cell out of a vehicle body, a rear body to which a pair of left and right rear wheels are journaled, and a linking mechanism which swingably links the rear body and front body to allow the front body to sway left and right with respect to the rear body and the drain pipe has a drain port between the pair of left and right rear wheels, the water generated by the fuel cell can be drained behind the vehicle body without being splashed on the rear wheels or rear body of the fuel cell three-wheeled vehicle. In addition, even when the front body sways, the rear body does not sway and the drain port position is unchanged, thus preventing the water from being splashed on the rear wheels or the rear body.

According to the second aspect of the present invention, the drain port is located behind and under the axle of the rear wheels when the vehicle body is viewed sideways, and the drain port is disposed on the rear side of the vehicle body near the road surface. Therefore, even if the generated water around the drain port is splashed due to the traveling wind or oscillation, is the water is prevented from being splashed on the rear wheels or the rear body.

According to the third aspect of the present invention, the vehicle includes a shock unit which suspends the rear body on the body frame and absorbs the vertical swinging motion of the rear body, and the drain pipe extends under the shock unit to the rear body's bottom side. Therefore, the drain pipe is less affected by the rear body's swinging motion and the water can be smoothly drained.

According to the fourth aspect of the present invention, the fuel cell is attached to the front body and located under the seat for a rider to sit on, the drain pipe includes a first drain pipe portion which guides the generated water from the fuel cell to under the linking mechanism and a second drain pipe portion which guides the generated water from under the linking mechanism out of the vehicle body, and the first drain pipe portion and the second drain pipe portion are supported by the vehicle body in a manner that the first drain pipe portion can circumferentially turn with respect to the second drain pipe portion. Therefore, even if the front body sways during running, the drain pipe is prevented from being twisted between the first drain pipe portion and the second drain pipe portion.

According to the fifth aspect of the present invention, the vehicle has a reservoir which temporarily stores the generated water between the first drain pipe portion and second drain pipe portion, the reservoir is attached to the rear body, and the first drain pipe portion is circumferentially turnably engaged with the reservoir. Therefore, even if the discharge speed of the generated water changes, the speed of drainage through the drain port is less affected and the drainage can be carried out smoothly. Moreover, even when the front body sways, the reservoir does not sway and the drainage can be carried out stably.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
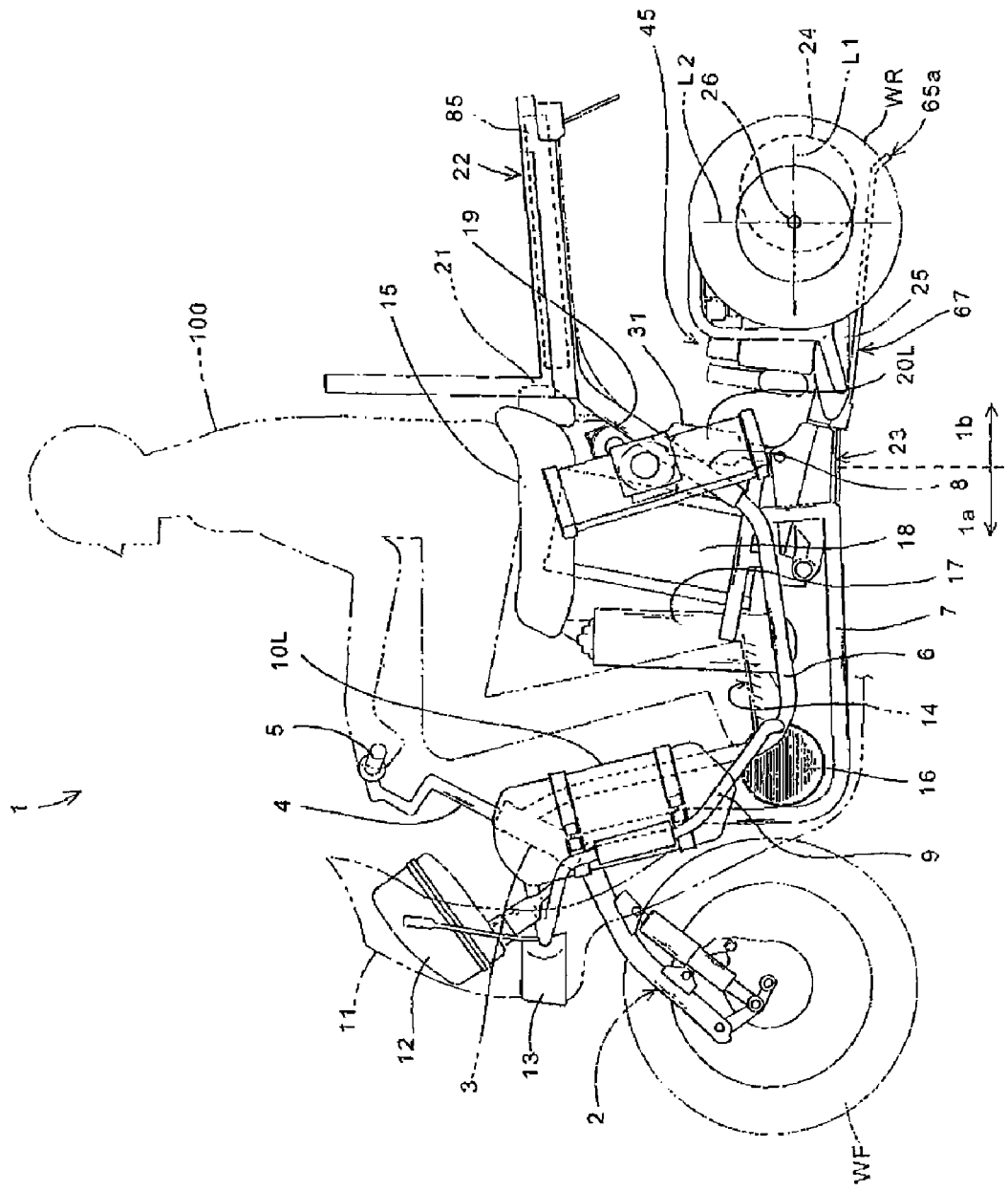
FIG. 1 is a side view of a saddle-ride type fuel cell three-wheeled vehicle according to an embodiment of the present invention.

The present invention will now be described in detail with reference to the accompanying drawings, wherein the same reference numerals will be used to identify the same or similar elements throughout the several views. It should be noted that the drawings should be viewed in the direction of orientation of the reference numerals.

Figure 2:
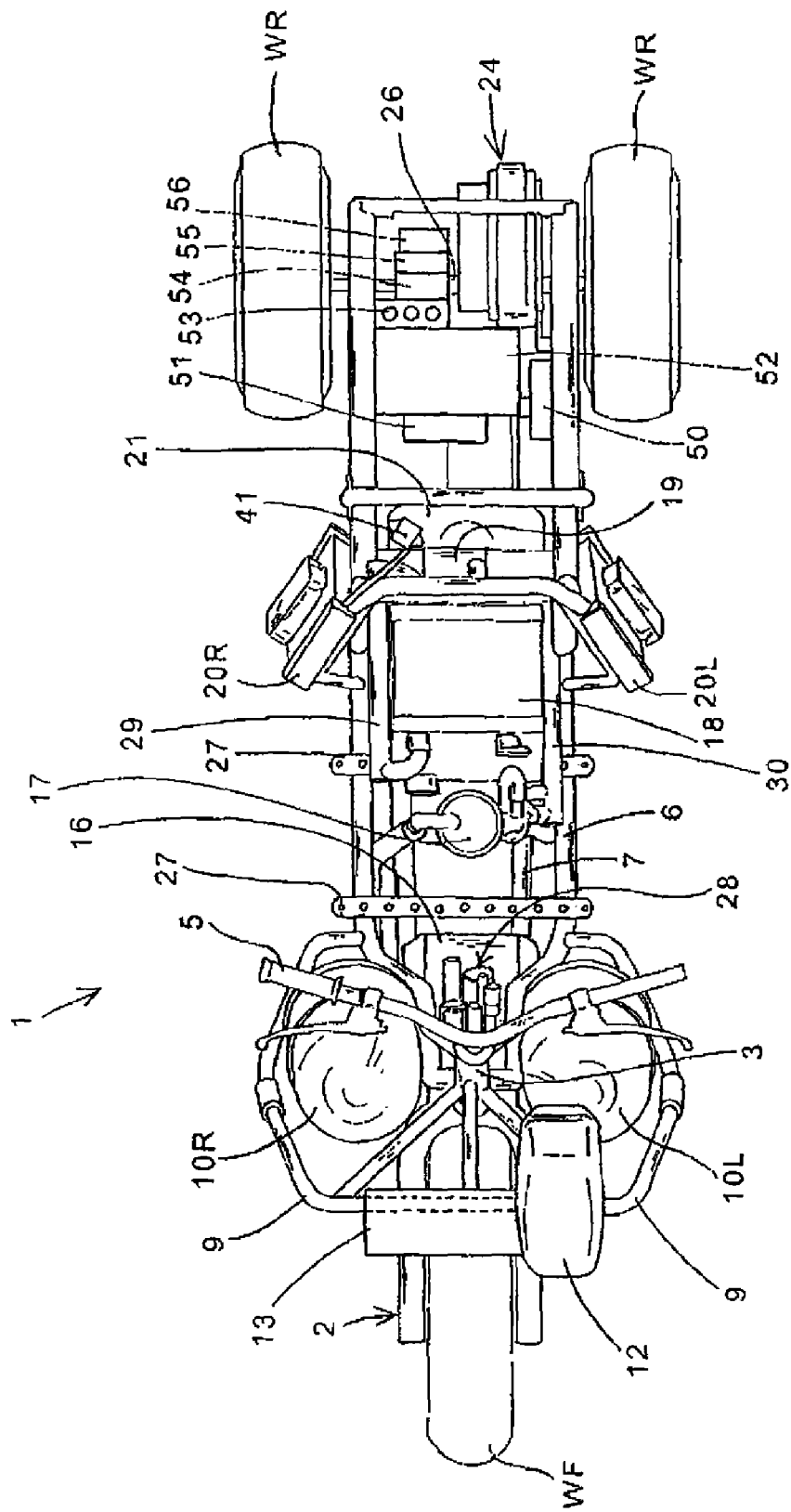
FIG. 2 is a top view of a saddle-ride type fuel cell three-wheeled vehicle according to an embodiment of the present invention.

A preferred embodiment of the present invention will be described referring to the accompanying drawings. FIGS. 1 and 2 are a side view and a top view of a saddle-ride type fuel cell three-wheeled vehicle according to an embodiment of the present invention. The saddle-ride type fuel cell three-wheeled vehicle 1 is an electric three-wheeled vehicle including one front wheel FW as a steering wheel, two motor-driven rear wheels WR and a scooter type body structure with a low-floor foot rest between a steering handlebar and a seat.

The saddle-ride type fuel cell three-wheeled vehicle 1 has a fuel cell power generation system. The fuel cell power generation system includes: a cell stack which constitutes a fuel cell as a stack of plural cells; a fuel (hydrogen) gas supply system to supply hydrogen gas as fuel to the cell stack; and a reaction gas supply system to supply reaction gas (air) containing oxygen to the cell stack. The three-wheeled vehicle 1 runs by driving a motor using the electric power generated by the fuel cell or electric power supplied from a secondary cell storing this electric power.

A steering system 4 which supports a bottom link front suspension 2 is turnably journaled to a head pipe 3 located at the front end of the body frame. A front wheel WF as a steering wheel is rotatably journaled to the lower end of the front suspension 2. The front wheel WF can be steered by a steering handlebar 5 coupled with the steering system 4. A pair of left and right main frames 6, connected with the head pipe 3, are shaped to extend downward and rearward from the head pipe 3, then sharply curve at a low part of the body and extend rearward of the vehicle body.

A pair of left and right under frames 7 whose shape follows that of the main frames 6 are located under the main frames 6. Like the main frames 6, the under frames 7 each has a vertical portion connected with the head pile 3 and extends downward and rearward from the head pile 3, and a horizontal portion which sharply curves at a lower part of the vehicle body and extends rearward. The rear end of each under frame 7 sharply curves upward and joins tie main frame 6, and the rear end of the main frame behind the joint is coupled with a rear frame 8. The rear frame 8 supports a loading platform 22 on the rear side of the vehicle body. A secondary cell 85 which stores the electric power generated by the fuel cell 18 is housed in the loading platform 22.

The fuel cell 18, substantially rectangular parallelepiped, is attached under a seat 15 for a rider 100 to sit on, as inclined rearward of the vehicle body at a specified angle (for example, 30 degrees). Radiators 20L, 20R for cooling the fuel cell 18 are adjacently located on the left and right sides of the fuel cell 18 in the vehicle body width direction. An electric pump 19 as an actuator to pressure-feed radiator cooling water is located on the back side of the fuel cell 18. A humidifier 17 for humidifying the reaction gas to be supplied to the fuel cell 18 is attached to the front side of the fuel cell 18. The substantially cylindrical humidifier 17 is located in the center of the vehicle body width direction under the seat 15.

A low-floor foot rest 14 is provided between the seat 15 and steering handlebar 5. The foot rest 14 is a flat floor, composed of a resin plate or the like, on which the rider places his/her feet during running. In this embodiment, it is symmetrical in shape in the vehicle body width direction. Stays 27 for supporting the resin plate of the foot rest 14 are attached to the upper face of the main frame 6 in front of the humidifier 17 and behind it in the longitudinal direction of the vehicle body. A supercharger 16 as an actuator to pressure-feed reaction gas to the fuel cell 18 is located in a space surrounded by the main frames 6 and the under frames 7 in front of and under the foot rest 14.

The body of the saddle-ride type fuel cell three-wheeled vehicle 1 is composed of a front body 1a including the body frame and front wheel WR, and a rear body 1b linked with the front body 1a. The rear body 1b including the rear wheels WR, and the front body 1a are linked through a linking mechanism 23. A shock unit 31 is attached to part of the linking mechanism 23 and a mounting frame (not shown) provided between the pair of left and right rear frames 8, and absorbs the shock of vertical swinging motion. The linking mechanism 23 adopts a Neidhardt swing mechanism which uses a rubber damper to get a biasing force to return the front body 1a to the neutral position. This makes it possible that the vehicle runs and turns, swaying the front body 1a left or right while the two rear wheels are in contact with the road surface.

A power unit 24 integrally incorporates a drive motor to give a driving force to the rear wheels WR and a speed reduction mechanism. The power unit 24 is attached to a rear part of the base member 25 of the rear body 1b and between the left and right rear wheels WR. The driving force provided by the power unit 24 is transmitted to the rear wheels WR through an axle 26. Driving system electric components 45, which are substantially rectangular parallelepiped large and small parts, are installed between the rear wheels WR of the rear body 1b. The driving system electric components 45 include: a motor driver 50 as a motor control unit to control the drive motor; a DC-DC converter 51 to convert the AC voltage value to a specified value; a voltage transducer (VCU) to increase or decrease the voltage supplied from the fuel cell 18; a main CPU 53 as a motor control unit; a control driver 54 to drive the supercharger 16; a control driver 55 to drive the electric pump 19; and a fuse box 56 to house a plurality of fuses.

A pair of left and right hydrogen cylinders 10L, 10R are installed on the left and right sides of the head pipe 3 in the vehicle body width direction in a way to sandwich the main frames 6 and the under frames 7 from both sides. The foot rest 14 is so formed as to fit inside the space between the ends of the hydrogen cylinders 10L, 10R as fuel tanks in the vehicle body width direction. The front and lateral sides of the hydrogen cylinders 10L, 10R are surrounded by a guard pipe 9 coupled with the main frames 6. An air cleaner box 12 for filtering the ambient air (air) to be used as reaction gas is located in front of and above the left hydrogen cylinder 10L. The front side of the vehicle is covered by a cowling 11 made of thin sheet resin or the like. A protective pad 13 attached to the front side of the guard pipe 9 is located so that part of the protective pad 13 faces outward through an opening in the cowling 11.

The left and right radiators 20L, 20R are installed so that their upper parts are inclined forward when the vehicle body is viewed sideways. In addition, when the vehicle body is viewed from above, they are installed so that their flat surfaces to receive traveling wind are inclined inward of the vehicle body to receive traveling wind from ahead of the vehicle body easily. A reservoir tank 21 for cooling water is installed behind and above the fuel cell 18, and a hydrogen sensor 41 is located above the reservoir tank 21.

A hydrogen supply unit 28 including a part for controlling the amount of hydrogen supplied to the fuel cell 18 is located between the left and right hydrogen cylinders 10L, 10R in the space surrounded by the left and right main frames 6 and the under frames 7. A suction manifold 29 which supplies the reaction gas humidified by the humidifier 17 from the top of the fuel cell 18 and an exhaust manifold 30 which exhausts unreacted gas which has not reacted chemically in the fuel cell 18 from the bottom of the fuel cell 18 are attached to the fuel cell 18. In FIG. 1, the center of the axle 26 of the rear wheels WR is expressed by the intersection of horizontal line L1 and vertical line L2.

Figure 3:
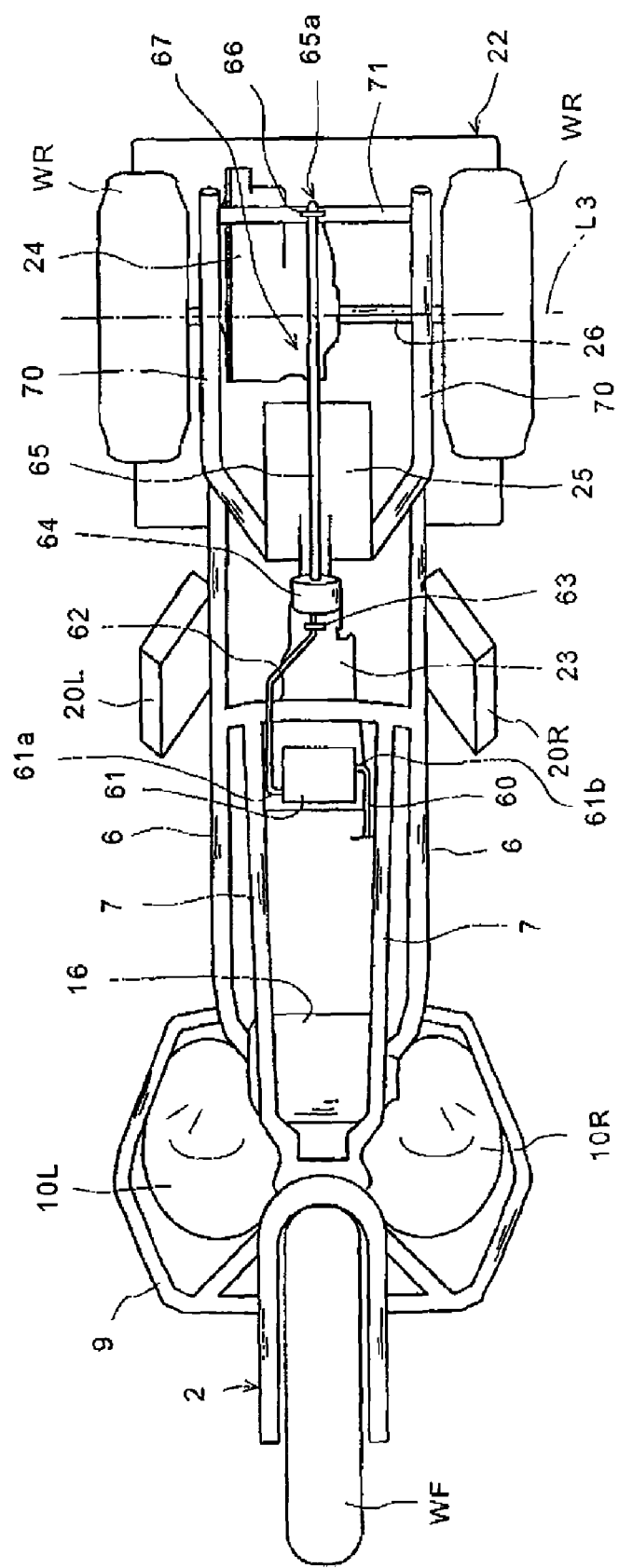
FIG. 3 is a bottom view of a saddle-ride type fuel cell three-wheeled vehicle according to an embodiment of the present invention.
Figure 4:
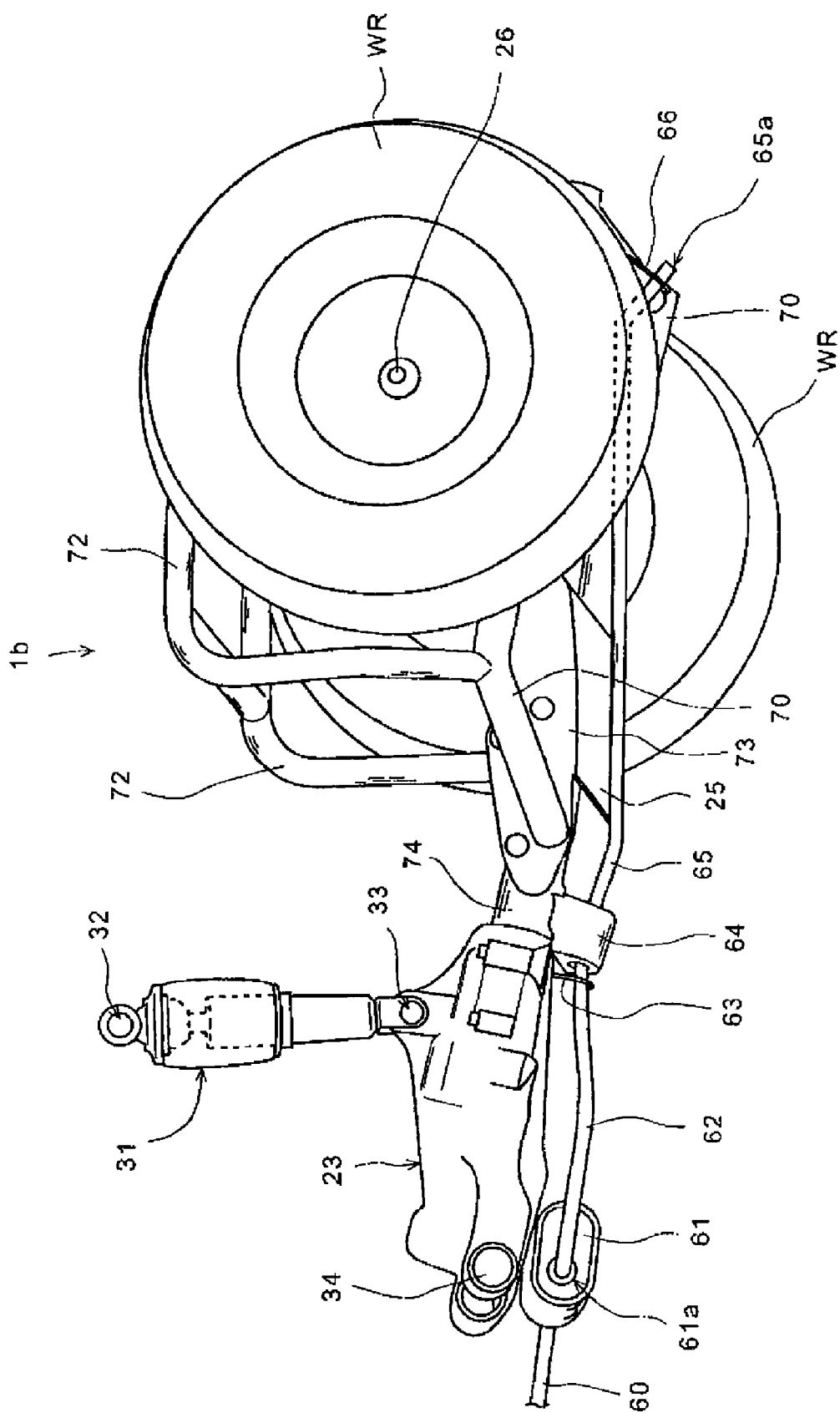
FIG. 4 is a perspective view of the rear body of a saddle-ride type fuel cell three-wheeled vehicle.

FIG. 3 is a bottom view of the saddle-ride type fuel cell three-wheeled vehicle 1. FIG. 4 is a perspective view of the rear body of the saddle-ride type fuel cell three-wheeled vehicle 1. The same reference numerals as given above represent the same or equivalent elements. The rear body, to which the rear wheels WR are journaled, has a structure such that the under pipes 70 connected with the upper pipes 72 are attached to a platy base member 25 and a plate frame 73 coupled with the base member 25. The rear ends of the pair of left and right under pipes 70 are connected by a connecting pipe 71 extending in the vehicle body width direction, enhancing the rigidity as a frame. In FIG. 3, the centerline L3 of the axle 26 of the rear wheels WR is shown.

A cylinder part 74 connected with the base member 25 and the plate frame 73 is turnably journaled to the linking mechanism 23, as the rotary shaft of the Neidhardt swing mechanism. The linking mechanism 23 is swingably linked to the body frame through a pivot part 34 at its front end. The shock unit 31, which provides a damping force to the rear body's swinging motion, is linked to the body frame through an upper pivot part 32 and to the linking mechanism 23 through a lower pivot part 33.

Generally, a fuel cell vehicle has a system to drain the water generated by the fuel cell during power generation out of the vehicle body. In this saddle-ride type fuel cell three-wheeled vehicle 1, the generated water discharged from the fuel cell 18 is guided rearward of the vehicle body through a drain pipe 67 located under the vehicle body and drained from between the pair of left and right rear wheels WR (i.e., within the inner width between the left and right rear wheels) out of the vehicle body. The drain pipe 67 includes: a first drain pipe portion composed of ducts 60, 62; and a second drain pipe portion 65 which is connected with the rear of the first drain pipe portion and extends to a rear part of the vehicle body. The first drain pipe portion and the second drain pipe portion may be made of resin such as rubber which can absorb an external force.

A silencer 61 which muffles the sound of drainage of the generated water is provided between the duct 60 and duct 62. Rubber gaskets or the like are used at joint 61a between the duct 62 and the silencer 61 and joint 61b (see FIG. 3) between the duct 60 and the silencer 61 to prevent discharge pressure leakage. The silencer 61 is fixed on the under frames 7 as constituents of the front body. Therefore, it is less affected by vertical swinging motion of the rear body 1b.

A reservoir 64 to temporarily store the generated water is provided between the duct 62 and the second drain pipe portion 65. Since this reservoir 64 is linked to the cylinder part 74, it is less affected even when the front body sways left and right during running. The rear end of the duct 62 is engaged with a hook 63, suspended by the linking mechanism 23, and turnably inserted into an inlet hole in the reservoir 64. In this structure, since no twisting occurs between the reservoir 64 and the duct 62 even when the front body sways, the duct 62 is hardly twisted and strained or the flow of generated water is hardly interrupted. Even in the absence of the reservoir 64, it is possible to prevent twisting of the drain pipe by connecting the first drain pipe portion and the second drain pipe portion circumferentially turnably with respect to each other.

As described above, after the generated water discharged from the fuel cell 18 is guided through the first drain pipe portion including the ducts 60, 62, to the reservoir 64 under the linking mechanism 23, it is guided through the second drain pipe portion 65 connected with the back of the reservoir 64 to the rear of the vehicle body. Since this series of drain pipes is located under the shock unit 31 and extends to the bottom side of the rear body, it is less affected by vertical swinging motion of the rear body than when it is located above the shock unit or otherwise. Furthermore, since the drain pipe's portion located more rearward is closer to the road surface, the generated water is drained more smoothly. The shapes of the first and second drain pipe portions are not limited to those in this embodiment but may be modified in various ways. For example, the second drain pipe portion 65 may extend rearward of the vehicle body along one of the left and right under pipes 70 and return to the center of the vehicle body width direction before the drain port 65a.

The generated water which has been guided through the second drain pipe portion 65 to the rear ends of the under pipes 70 is drained through the drain port 65a located at its tip and oriented toward the road surface. The second drain pipe portion 65 is suspended in the vicinity of the drain port 65 by a hook 66 attached to the connecting pipe 71. Since the drain port 65 according to this embodiment is located behind and under the axle 26 of the rear wheels WR when the vehicle body is viewed sideways, even if drops of the generated water from the drain port are splashed due to traveling wind or oscillation, they are prevented from being splashed on the rear wheels WR or rear body.

Figure 5:
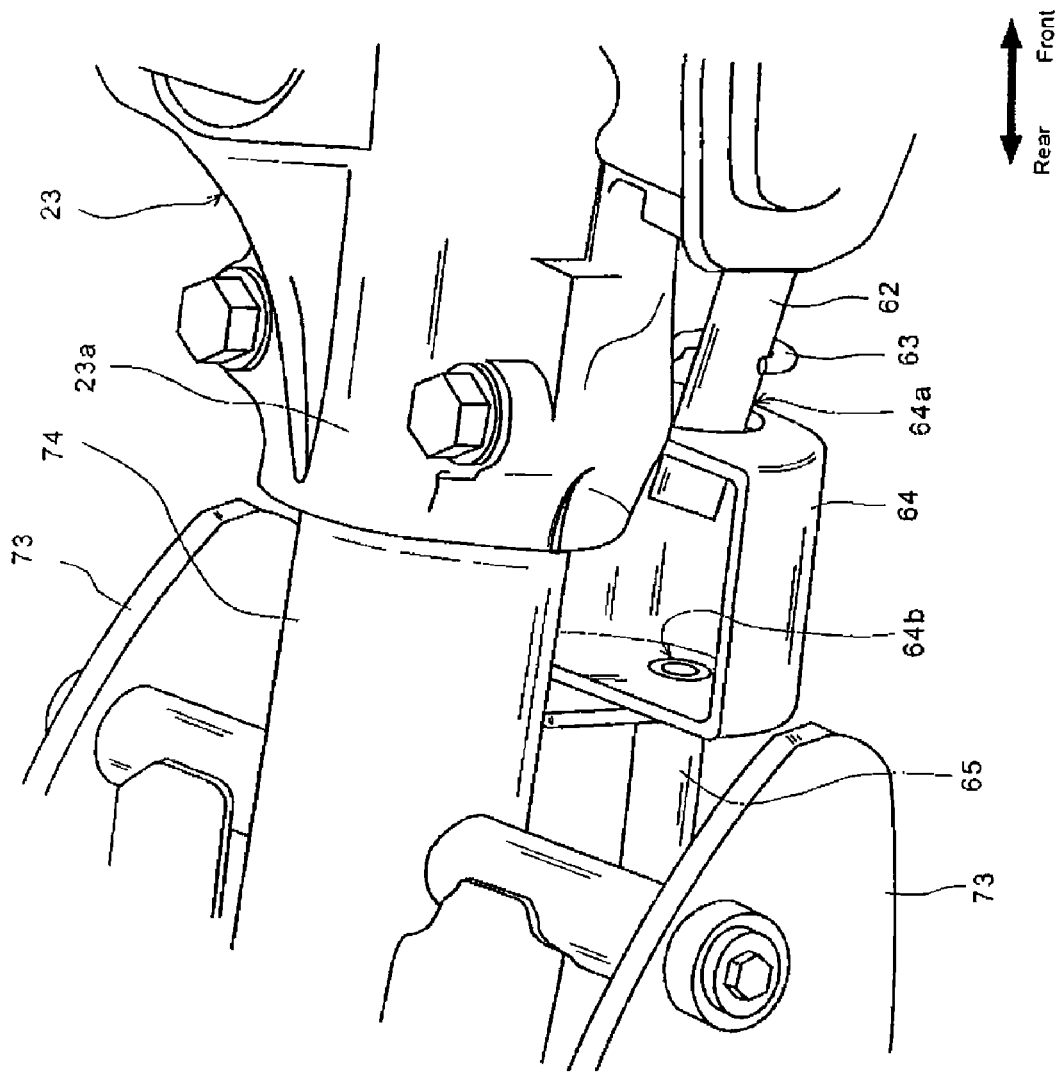
FIG. 5 is an enlarged fragmentary view of the linking mechanism of a saddle-ride type fuel cell three-wheeled vehicle.

FIG. 5 is an enlarged fragmentary view of the linking mechanism. The same reference numerals as given above represent the same or equivalent elements. As shown in FIG. 5, the vehicle body is shown with its front oriented to the light. As described earlier, the cylinder part 74 connected with a pair of left and right plate frames 73 is turnably journaled to the body part 23a of the linking mechanism 23, as the rotary shaft of the Neidhardt swing mechanism. In this embodiment, the reservoir 64 which temporarily stores the generated water is attached under the cylinder part 74.

The reservoir 64 is a concave container made of thin sheet metal or resin. Even when the discharge speed of generated water from the duct 62 fluctuates, it stores the generated water temporarily and stabilizes fluctuation in the discharge speed before supplying the water to the second drain pipe portion 65. The second drain pipe portion 65 is coupled with the reservoir 64 in a way that no water leakage occurs at the joint 64b. On the other hand, the end of the duct 62 of the first drain pipe portion is turnably inserted into an inlet hole 64a made in the reservoir 64. The size of the inlet hole 64 is such that when the duct 62 is inserted in it, there remains space around it. Therefore, even if the front body sways seriously, this space absorbs its twist easily. The top of the reservoir 64 according to this embodiment is open but a cap member may be put on it so that the generated water does not spill even when the rear body swings up and down.

As described above, in the saddle-ride type fuel cell three-wheeled vehicle according to an embodiment of the present invention, the drain port of the drain pipe for the generated water is located between the pair of left and right rear wheels behind and under the axle of the rear wheels. Therefore, the water generated by the fuel cell can be drained without being splashed on the rear wheels or rear body. In addition, since the first drain pipe portion can freely turn with respect to the second drain pipe portion, the drain pipe is not twisted, and the generated water can be drained smoothly even when the front body sways during running.

The shape and material of the first drain pipe portion and the second drain pipe portion, the shape and location of the reservoir, the method of connecting the reservoir and the drain pipe and so on are not limited to those in the above embodiment but may be modified in various ways. For example, the second drain pipe portion, which is less affected by vertical and horizontal swinging motions, may be made of hard resin or metal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle-ride three-wheeled vehicle having a fuel cell which generates an electric power by a chemical reaction between a fuel gas and a reaction gas, the three-wheeled vehicle comprising:
    a drain pipe which guides water discharged from the fuel cell out of a vehicle body;
    a rear body to which a pair of left and right rear wheels are journaled; and
    a linking mechanism which swingably links the rear body and a front body to allow the front body to sway left and right with respect to the rear body,
    wherein the drain pipe includes a front drain pipe portion under the linking mechanism and a rear drain pipe portion that has a drain port between the pair of left and right rear wheels, and the front drain pipe portion is circumferentially turnable with respect to the rear drain pipe portion.

2. The saddle-ride three-wheeled vehicle according to claim 1, wherein the drain port is located behind and under an axle of the rear wheels when the vehicle body is viewed sideways.

3. The saddle-ride three-wheeled vehicle according to claim 2, further comprising a shock unit which suspends the rear body on a body frame and absorbs a vertical swinging motion of the rear body, wherein the drain pipe extends under the shock unit to a bottom side of the rear body.

4. The saddle-ride three-wheeled vehicle according to claim 2, wherein the fuel cell is attached to the front body and located under a seat for a rider to sit on, wherein the front drain pipe portion guides the water from the fuel cell to under the linking mechanism and the rear drain pipe portion guides the water from under the linking mechanism out of the vehicle body.

5. The saddle-ride three-wheeled vehicle according to claim 4, further comprising a reservoir which temporarily stores the water between the front drain pipe portion and the rear drain pipe portion, wherein the reservoir is attached to the rear body and the front drain pipe portion is circumferentially turnably engaged with the reservoir.

6. The saddle-ride three-wheeled vehicle according to claim 1, further comprising a shock unit which suspends the rear body on a body frame and absorbs a vertical swinging motion of the rear body, wherein the drain pipe extends under the shock unit to a bottom side of the rear body.

7. The saddle-ride three-wheeled vehicle according to claim 6, wherein the fuel cell is attached to the front body and located under a seat for a rider to sit on, wherein the front drain pipe portion guides the water from the fuel cell to under the linking mechanism and the rear drain pipe portion guides the water from under the linking mechanism out of the vehicle body.

8. The saddle-ride three-wheeled vehicle according to claim 7, further comprising a reservoir which temporarily stores the water between the front drain pipe portion and the rear drain pipe portion, wherein the reservoir is attached to the rear body and the front drain pipe portion is circumferentially turnably engaged with the reservoir.

9. The saddle-ride three-wheeled vehicle according to claim 1, wherein the fuel cell is attached to the front body and located under a seat for a rider to sit on, wherein the front drain pipe portion guides the water from the fuel cell to under the linking mechanism and the rear drain pipe portion guides the water from under the linking mechanism out of the vehicle body.

10. The saddle-ride three-wheeled vehicle according to claim 9, further comprising a reservoir which temporarily stores the water between the front drain pipe portion and the rear drain pipe portion, wherein the reservoir is attached to the rear body and the front drain pipe portion is circumferentially turnably engaged with the reservoir.

11. A saddle-ride three-wheeled vehicle having a fuel cell which generates an electric power by a chemical reaction between a fuel gas and a reaction gas, the three-wheeled vehicle comprising:

a drain pipe which guides water discharged from the fuel cell out of a vehicle body;

a rear body to which a pair of left and right rear wheels are journaled; and a linking mechanism which swingably links the rear body and a front body to allow the front body to sway left and right with respect to the rear body, wherein the drain pipe has a drain port between the pair of left and right rear wheels, and wherein the fuel cell is attached to the front body and located under a seat for a rider to sit on, wherein the drain pipe includes a first drain pipe portion which guides the water from the fuel cell to under the linking mechanism and a second drain pipe portion which guides the water from under the linking mechanism out of the vehicle body, and wherein the first drain pipe portion and the second drain pipe portion are supported by the vehicle body in a manner that the first drain pipe portion is circumferentially turnable with respect to the second drain pipe portion.

12. The saddle-ride three-wheeled vehicle according to claim 11, further comprising a reservoir which temporarily stores the water between the first drain pipe portion and the second drain pipe portion, wherein the reservoir is attached to the rear body and the first drain pipe portion is circumferentially turnably engaged with the reservoir.

13. A three-wheeled vehicle comprising:

a fuel cell which generates an electric power by a chemical reaction between a fuel gas and a reaction gas;

a drain pipe which guides water discharged from the fuel cell out of a vehicle body;

a rear body to which a pair of left and right rear wheels are journaled; and a linking mechanism which swingably links the rear body and a front body to allow the front body to sway left and right with respect to the rear body, wherein the drain pipe has a drain port between the pair of left and right rear wheels, and wherein the drain pipe includes:

a first drain pipe portion which guides the water from the fuel cell to under the linking mechanism; and a second drain pipe portion which guides the water from under the linking mechanism out of the vehicle body, wherein the first drain pipe portion is circumferentially turnable with respect to the second drain pipe portion.

14. The three-wheeled vehicle according to claim 13, wherein the drain port is located behind and under an axle of the rear wheels when the vehicle body is viewed sideways.

15. The three-wheeled vehicle according to claim 13, further comprising a shock unit which suspends the rear body on a body frame and absorbs a vertical swinging motion of the rear body, wherein the drain pipe extends under the shock unit to a bottom side of the rear body.

16. The three-wheeled vehicle according to claim 13, further comprising a reservoir which temporarily stores the water between the first drain pipe portion and the second drain pipe portion, wherein the reservoir is attached to the rear body and the first drain pipe portion is circumferentially turnably engaged with the reservoir.

17. The three-wheeled vehicle according to claim 16, further comprising a cylinder turnably journaled to the linking mechanism, wherein the reservoir is attached to and under a rotary shaft.

* * * * *